Aug. 9, 1949.　　　F. O. JOHNSON　　　2,478,401
DISPENSING MACHINE

Filed Feb. 8, 1946　　　　　　　　　　　5 Sheets-Sheet 1

FREDERICK ORLO JOHNSON
*INVENTOR.*

BY

*ATTORNEY*

Aug. 9, 1949.　　　　F. O. JOHNSON　　　　2,478,401
DISPENSING MACHINE

Filed Feb. 8, 1946　　　　　　　　　　　　5 Sheets-Sheet 3

FREDERICK ORLO JOHNSON
*INVENTOR*
BY *Arthur M. Smith*
ATTORNEY

Patented Aug. 9, 1949

2,478,401

UNITED STATES PATENT OFFICE 2,478,401

DISPENSING MACHINE

Frederick Orlo Johnson, Detroit, Mich.

Application February 8, 1946, Serial No. 646,335

18 Claims. (Cl. 31—12)

The present invention relates to a dispensing machine and particularly to such a machine adapted to extrude, cut-off and dispense a selected portion of an extrudable material, such for example as butter and the like or similar substances. A principal object of the invention is to provide a dispensing machine in which butter or a like extrudable substance may be maintained at a desired extrusion temperature and extruded from a container or pressure chamber in selected amounts and is thereafter severed by a reciprocating cutter to produce blocks or pieces thereof of a satisfactory appearance and uniform size.

It is a further object of the present invention to provide such a dispensing machine which is practically noiseless in operation, and which is of a relatively simple construction, and which is easy to operate and service, and which is positive in its operation. The machne of the present invention being so designed and constructed as to conform to all sanitary regulations for machines utilized in the handling and dispensing of bulk food stuffs or dairy products.

A further object of the present invention is to provide a dispensing machine particularly adapted for extruding and dispensing butter and the like or similar materials in which separate blocks, chips, patties or servings are selectively cut from an extruded strip of such material and in which the thickness of each individual piece conforms to a desired standard of thickness, which standard may be varied by a simple adjustment of the machine.

It is the further object of the present invention to provide a dispensing machine in which print, roll or bulk butter or similar materials may be utilized in the machine and discharged therefrom through an extrusion orifice of selected size and shape and in which the individual servings will be cut as needed upon each operation of the machine, thus reducing waste of the butter or similar materials while assuring uniform servings thereof to the consumer.

A further object of the present invention is to provide a machine for dispensing butter or similar materials in which the thickness of the individual servings may be easily regulated to assure the serving of a predetermined portion to each customer, the machine having a sanitary, refrigerated chamber in which the bulk material is stored so that the entire operation of extruding, cutting and dispensing the said predetermined portions is accomplished without allowing the materials to come in contact with sources of contamination.

It is the further object of the present invention to provide a machine particularly adapted for dispensing butter or similar extrudable food materials in which the thickness of the dispensed patty or chip is controlled at the point where the patty or chip is separated from the continuous strip of extruded material.

A dispensing machine embodying the present invention is particularly adapted for forming butter chips or patties such as are served in restaurants, hotel dining rooms, and other places where a large number of individual portions of butter are needed. Conventional methods of providing separate patties or chips of butter have not been satisfactory either from the economic or the sanitary standpoint. From the economic standpoint the variations in thicknesses of the butter pats or chips when cut manually, or by the machines previously known in the art, prevents an accurate ascertainment of the number of servings supplied from a given amount of butter. It frequently occurs that with several customers seated at a table, the variations in thicknesses of the butter pats or chips will be so marked as to lead to customer complaints and frequently for requests for additional butter. Such procedures, in addition to causing customer complaints also are not economical for some customers will get more butter than needed while other customers will get less butter than needed. In conventional practice the separated butter chips or patties are prepared in advance of being served and are floated in a container of ice water or the like from which they are removed as needed at the time of serving the customer. Such methods usually produce a hard, brittle, and frequently discolored chip which usually is difficult to remove from the ice water in the container and which, does not have a proper spreading consistency when served to the customer. In addition, such methods of handling butter in open containers provide many opportunities for contamination of the butter and this alone is frequently a source of substantial loss in the handling and serving of butter.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A dispensing machine of the present invention in a preferred embodiment shown in the drawings, by way of example, comprises a housing 20 enclosing all parts of the mechanism. A dispensing opening 21 is provided in the front face of the housing 20 and hinged access door 22 extends through the housing 20 and permits access to the dispensing tube as hereinafter more fully described. A removable panel 23 also located on the face portion of the housing 20 permits access to the dispensing mechanism and cut-off knife, to be hereinafter more fully described. An access door 24 in the top of the housing 20 communicates with a storage chamber 93 for the convenient storage of bulk materials to be dispensed. A contact plate 25 is provided in the dispensing opening 21 and is adapted to be actuated by the user when a portion of material is to be dispensed from the machine. The contact plate 25 is so located relative to the dispensing mechanism of the machine that if contacted by a plate or similar receptacle, the dispensed material will be cut off and drop directly on such plate or similar receptacle.

Figure 4:
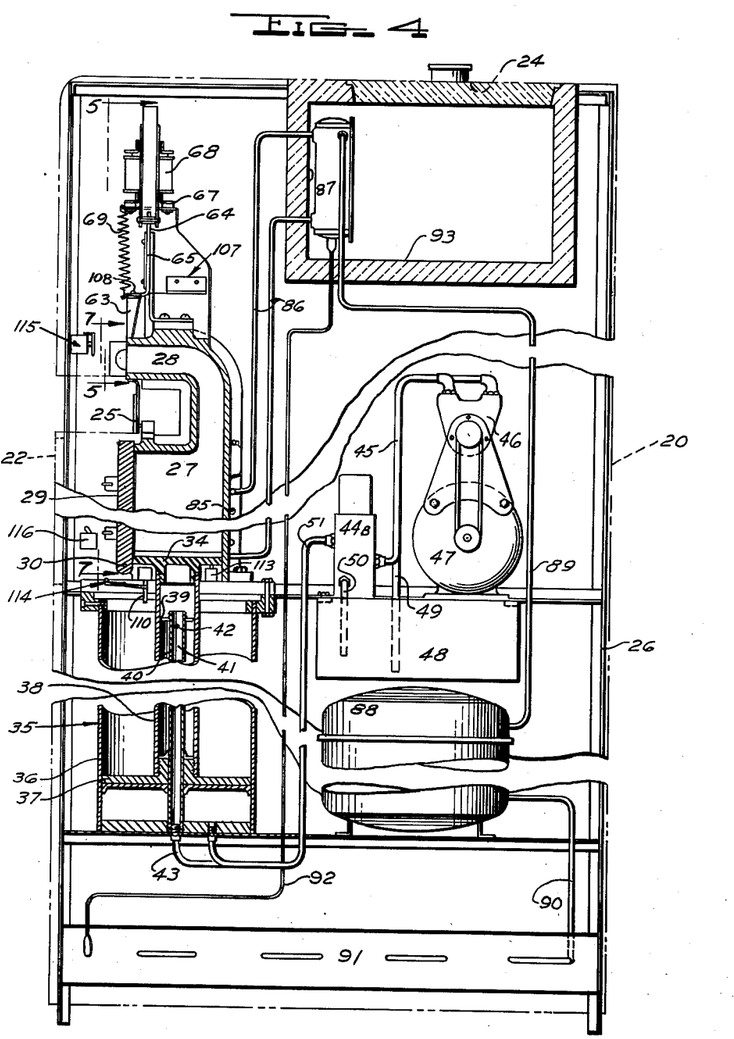
Fig. 4 is a fragmentary enlarged section taken substantially on the line 4—4 of Fig. 1, and looking in the direction of the arrows, showing a machine of the present invention with the outer casing removed.
Figures 7, 8:
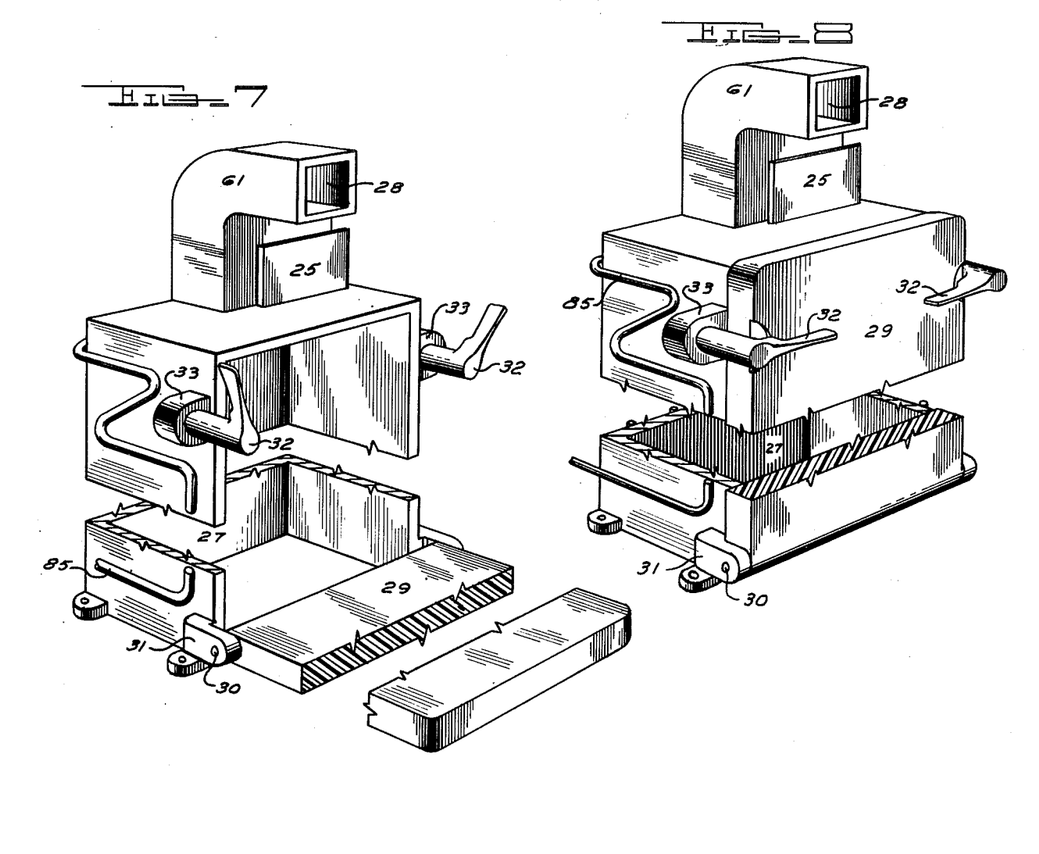
Figs. 7 and 8 are simplified enlarged fragmentary perspective views of the tube and extruding nozzle portions of the machine, the views showing that portion of the mechanism indicated by the line 7—7, Fig. 4, the views each being taken in the direction of the arrows.

The mechanism enclosed in the housing 20, as shown in Fig. 4 is mounted on the rigid frame member 26. The mechanism includes a storage and dispensing tube 27 having an extrusion orifice 28 of any desired cross sectional configuration, but which is here shown as being substantially square. When used to dispense butter or similar food or dairy products, the tube 27 and extrusion orifice 28 are preferably formed of a non-corrosive sanitary material, such for example, as metal, plastics, glass, porcelain, china, and the like or similar materials. As here shown, the body portion of the tube 27 consists of three sides, formed of a non-corrosive metal alloy such for example as "dairy metal," and is provided with a pivoted face plate 29 which may be formed of metal or a transparent non-corrosive material having a low thermal conductivity, such for example as a plastic sheet or a thermally insulated glass panel. The plate 29 shown particularly in Figs. 7 and 8 is formed of a transparent plastic material and is pivotally connected at the points 30 to brackets 31 carried on the base of the side walls of the dispensing tube 21. Clamping lugs 32 are provided on each side of the plate 29 adjacent the top thereof and are rotatably mounted in bosses 33 carried on the upper portions of the side walls of the dispensing tube 27. In Fig. 7, the plate 29 is shown in its open position to permit servicing of the machine, and from this view it will be seen that ready access is had to the entire interior of the tube 27 when the plate 29 is open. This facilitates servicing and cleaning operations. The use of such a pivoted transparent plate is recommended for it permits inspection of the interior of the tube 27 while the machine is in operation and permits the operator to observe whether or not the machine needs servicing by a visual inspection of the tube 27 when the door 22 of the housing 20 is open. As here shown, the dispensing tube 27 and the extrusion orifice 28 are formed as a single casting of metal but it is to be understood that they may be formed separately, or that they may be fabricated from sheet stock, if desired.

The dispensing tube 27 as here shown has an open bottom through which extends a pressure plate 34 which is reciprocally mounted in the dispensing tube 27 and is adapted to exert a pressure on the contents of the tube 27 to force such contents upwardly through the extrusion orifice 28. The pressure plate 34 is caused to reciprocate in the dispensing tube 27 by a two speed hydraulic power member indicated generally by the number 35.

The hydraulic power member 35 comprises an enclosed cylinder 36 in which is mounted a power driven piston 37 which is connected with the pressure plate 34 by a hollow tubular connector 38 secured to the bottom of the pressure plate 34 and acting as a connecting rod for transmitting motion from the piston 37 to the pressure plate 34. A fixed piston 39 is maintained in fluid tight contact with the interior walls of the tubular connector 38 and is secured to a fixed tube 40 having a plurality of hydraulic fluid supply ports 41 and 42 communicating with the interior of the connector 38 at points below the fixed piston 39. An hydraulic line 43 connects with the interior of said fixed tube 40 and leads to a solenoid controlled hydraulic flow valve 44A (Fig. 10) which in turn is connected with the pressure line 45 leading from the discharge part of an hydraulic pump 46 driven by an electric motor 47. Hydraulic fluid is normally maintained in an hydraulic sump 48 and is drawn therefrom by the pump 46 through an intake line 49. A return line 50 leads from the hydraulic control valves 44, 44A and 44B to return a bypass fluid to the sump 48 when required. A supply line 51 leads from the valve 44 to the hydraulic power number 35 supply the pressure fluid from the pump 46 to effect movement of the piston 37. The hydraulic control valves each comprise a chamber 111 having parts connected with the hydraulic lines. A solenoid controlled spool or plunger is provided in each chamber 111 and is moved as required by the energizing or de-energizing of the electrical control circuit. The operation and control of the said hydraulic circuit will be more fully described hereinafter in connection with the description of the operation of the machine.

A cut-off mechanism 60 (best shown in Figs. 5 and 6) is mounted on a bracket 61 which is secured to the top portion of the casting in which the extrusion orifice 28 is formed. The cut-off mechanism 60 comprises a vertically reciprocating knife 62 here shown as a steel wire secured in tension to the opposed arms of an inverted U-shaped knife bracket 63 mounted on a reciprocating slide 64 mounted for reciprocation in fixed ways 65 and 66 carried on the bracket 61.

Figures 5, 6:
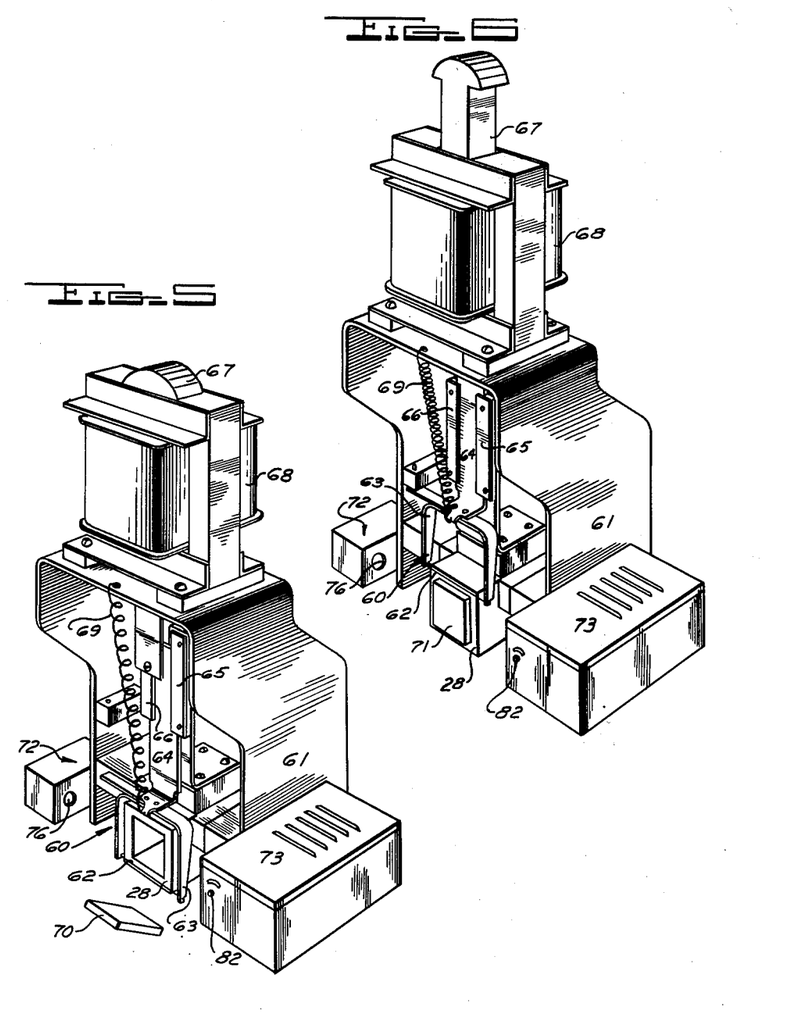
Figs. 5 and 6 are simplified enlarged perspective views of the cut-off mechanism and associated parts showing the cut-off knife respectively in its cut-off and retracted positions, the views each showing that portion of the machine indicated by the line 5—5 in Fig. 4, the views each being taken in the direction of the arrows.

The reciprocating slide 64 is operatively connected with the plunger 67 of an electrically actuated solenoid 68 which imparts a power stroke to the knife 62 when it is moved in the downward direction. A return spring 69 is connected between the end of the slide 64 and the bracket 61 and assists in returning the knife 62 to its raised position after completion of the cut-off stroke. As shown in Fig. 5, the knife 62 is at the end of its downward stroke and it has cut off a pat or chip 70 of extruded material. As shown in Fig. 6 the knife 62 is in its raised position and a portion 71 of extruded material has been extruded from the orifice 28 and is ready for the cut-off operation.

Figures 1, 3, 9:
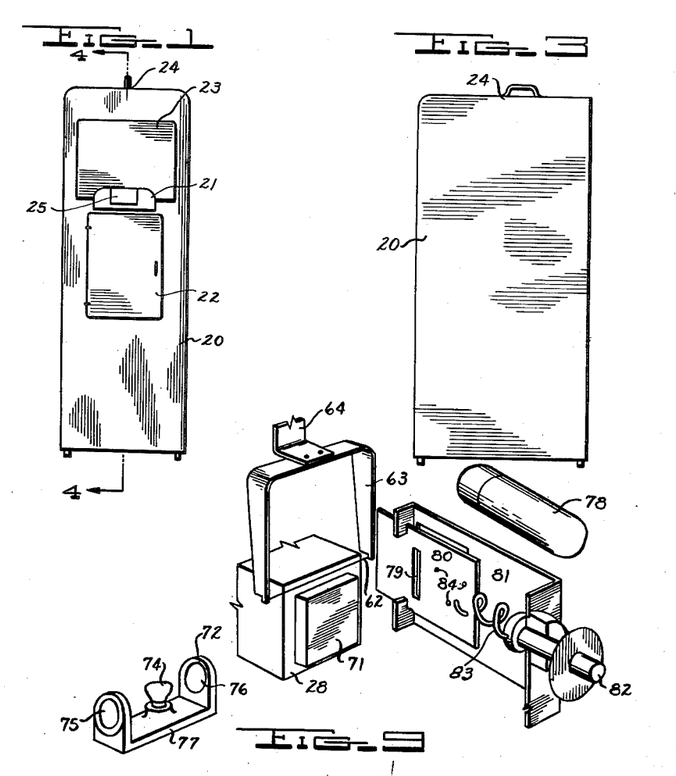
Fig. 1 is a front elevation of a preferred form of dispensing machine embodying the present invention.
Fig. 3 is a side elevation of the machine shown in Fig. 1.
Fig. 9 is a schematic view in exploded perspective, showing a portion of the cut-off mechanism and the mechanism for controlling the thickness of the portions to be cut-off by the machine operation.
Figure 2:
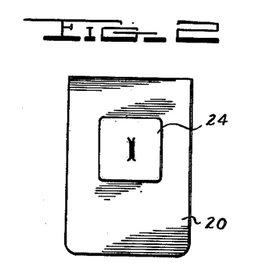
Fig. 2 is a top plan view of the machine shown in Fig. 1.

The thickness of the portion 71 of extruded material is controlled by an adjustable control mechanism which includes a light source 72 and a photo-electric control device 73. As shown in Fig. 9, the light source 72 comprises primarily an exciter lamp 74, a reflector 75 and a lens 76 suitably mounted on a base 77. The exciter lamp 74 is electrically connected with an electric power source and the light emitted thereby is focused through the lens 76 and falls on a photo-electric tube 78 which is electrically connected with a suitable photo-tube control circuit to be hereinafter more fully described. The light from the exciter lamp 74 must pass through an aperture 79 in an adjustable slide 80 mounted in a bracket 81 and moved relative thereto by adjustment of an adjusting knob member 82. While any suitable connector may be provided between the adjuster knob member 82 and the slide 80, I prefer to use a conventional type of rotatable wire helix or screw 83 which moves into openings 84 in the slide 80 to effect its longitudinal reciprocation in response to the rotation of the knob 82.

When the extruded material 71 blocks the light from passing through the aperture 79 to the photo-tube 78, the operation of the machine is stopped, until the cut-off mechanism 60 is actuated. When the chip 70 of extruded material is cut off, the light passes through the aperture 79 and falls on the tube 78 and the machine is then operated until the extruded material 71 again blocks off the light from the photo-tube 78 and the machine is again stopped. The adjusted location of the aperture 79 determines how much of the material 71 must be extruded from the orifice 28 before the machine is stopped. Hence the position of the slide 80 as adjusted by the knob 82, determines the distance that the extruded material 71 extends out of the orifice 28 and this in turn regulates the thickness of the chip 70.

In order to maintain the proper consistency or plasticity of the material to be extruded, it is desirable to control the temperature of the tube 27 and of the orifice 28. In the case of extruding material such as butter, refrigerating coils 85 are secured in heat exchange relation to the walls of the tube 27 and the orifice 28 and act to maintain these walls at the desired temperature to regulate the plasticity of the butter. The refrigerating coils 85 are connected through lines 86 with an evaporator and surge tank 87 to which refrigerant is supplied by a refrigerant compressor 88 through a pressure reducing line 89. The refrigerant is pumped by the compressor 88 through a line 90 connected with a condenser 91 which in turn is connected by a line 92 with the evaporator and surge tank 87.

The evaporator and surge tank 87 is located in the thermally insulated bulk storage compartment 93 and maintains the desired temperature therein. The compartment 93 provides a readily available source for the bulk storage of material to be extruded from the machine and ready access is had to this compartment through the access door 24 opening in the top of the housing 20.

Figure 10:
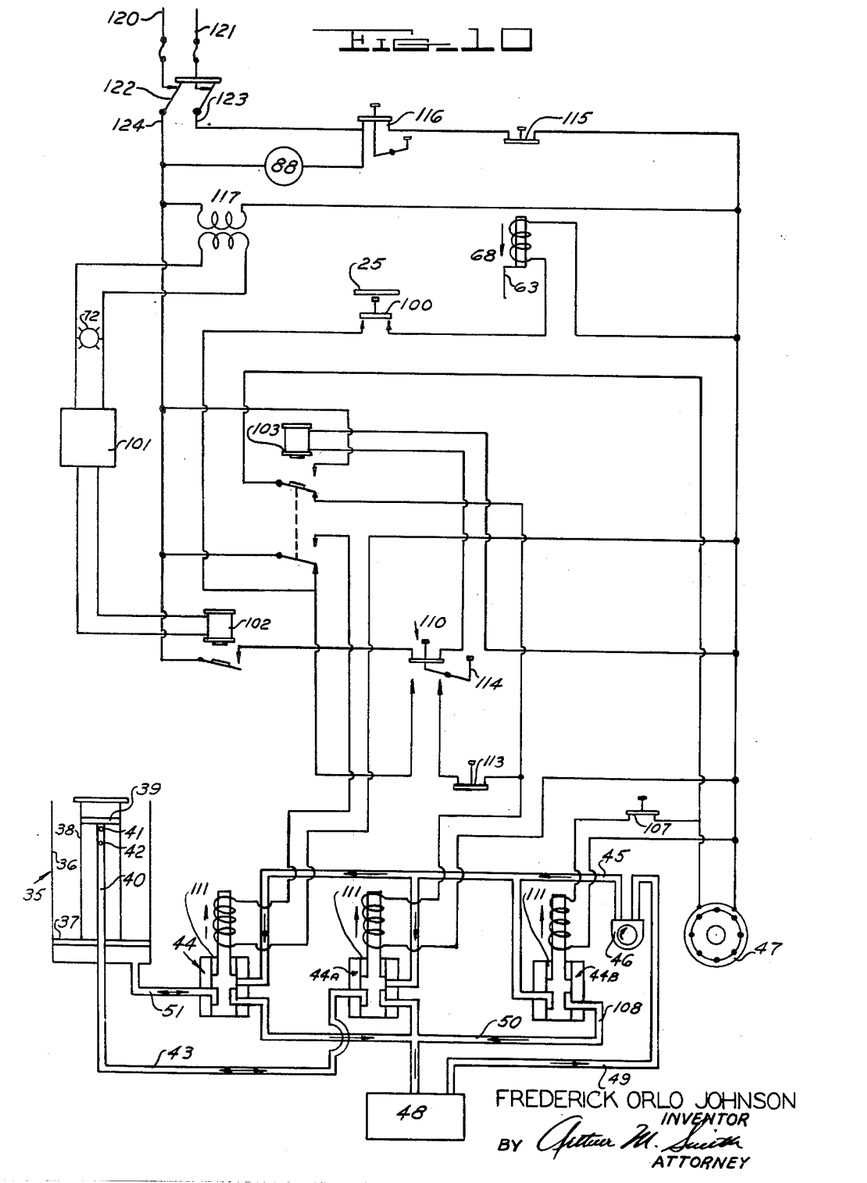
Fig. 10 is a circuit diagram showing the electrical and hydraulic circuits embodied in a machine embodying the present invention.

The operation of the machine will be best understood by reference to Fig. 10 in which the hydraulic and electrical control circuits of the machine are shown diagrammatically. As there shown, the machine is connected with a source of electric power supplied through the lead lines 120 and 121 and through a main switch 122 to the supply lines 123 and 124. A switch 100 is electrically connected in the circuit and is the starting switch for the machine. The switch 100 is actuated by movement of the plate 25 to close the circuit and energize the knife solenoid 68 to cut off the previously extruded material 71 to form the separated chip 70. This is the only action of the machine which is controlled directly by said switch 100.

The light source 72 is electrically connected in the circuit and activates the photo-electric tube circuit 101 which closes a telephone-type relay 102 electrically connected therewith to actuate the electrically connected relay 103 which establishes the circuit to the solenoid controlled hydraulic flow valve 44 and to the hydraulic pump motor 47. When the circuit is closed through the relays 102 and 103, the motor 47 operates the hydraulic pump 46 to cause a flow of hydraulic pressure fluid through the valve 44 to the piston 37. When sufficient material is extruded through the extrusion orifice 28 to break the light beam from the light source 72 as previously described, the relay 102 is de-energized by the photo-electric tube circuit 101 and the flow of current to the relay 103 is broken. This completes one cycle of the machine.

To prevent cutting of the extruded material by operation of the cut-off mechanism 60 on the backstroke of the knife 62, provision is made to prevent feeding of the material when the knife 62 is in the down position. This is accomplished by the use of a by-pass switch 107 which is operated by an arm or contact point 108 on the shoulder of the knife carrying bracket 63. The switch 107 is closed only when the knife 62 is in its fully raised position, as at the beginning of a cycle. Until switch 107 is closed, the valve 44B acts to by-pass the oil flow from the pump 46 to the sump 48 through the line 108. When the switch 107 is closed by the return of the knife 62 to the raised position, the valve 44B is actuated to prevent further by-passing of the pressure fluid and the hydraulic flow is maintained through the line 45 to the valve 44 and to the piston 37. This causes extrusion of the material through the orifice 28 until the desired amount is extruded at which time the circuit to the motor 47 is broken and this cuts off the supply of hydraulic pressure fluid to the piston 37, as previously described.

The reversing cycle of the piston 37 as here shown is controlled through a semi-automatic manually reset circuit. When the piston 37 reaches the top of the cylinder 36 it contacts a switch 110 which operates the solenoid on the valve 44A to establish a flow of pressure fluid through valve 44A so that the hydraulic pressure fluid flow is from the line 45 through the line 43, the tube 40 and the ports 41 and 42 and into the small chamber below the fixed piston 39. Due to the fact that the area of the piston 39 is less than the area of the piston 37, the same volume of hydraulic pressure fluid when flowing through the ports 41 and 42 will effect a much more rapid movement of the piston 37 on its return stroke than where the same volume of pressure fluid is delivered into the chamber below the piston 37 and acts on its larger area. The return of the piston 37 carries with it the return of the pressure member 34 in the tube 27. When the pressure member 34 is fully returned it opens switch 113 to shut off the motor 47 and at the same time acts on the solenoid valve 44A to by-pass the hydraulic pressure fluid through the line 108.

The manual reset button 114 can be operated when the plate 29 is closed and the machine is ready to function.

A switch 115 is electrically connected in the circuit to provide a safety switch for the photoelectric cell circuit 101. In the event that the machine should continue to operate to extrude material through the orifice 28, as for example upon failure of the controls to function properly, the machine would continue to extrude material through the orifice 28. When the material is so extruded to a point where it makes physical contact with the switch 115 the circuit controlling the extrusion is broken and the feeding mechanism is prevented from operating. This, however, does not affect the circuit to the refrigerant compressor 88 so that the temperature of the machine continues to be maintained at the desired level.

A night switch 116 is electrically connected in the circuit and is manually operated so as to cut-off the circuit through the extruding mechanism of the machine without cutting off the flow of current through the circuit to the refrigerant compressor 88. As shown in the circuit diagram, the refrigerator compressor 88 is electrically connected in the main circuit 123, 124, with a suitable source of electric current. A transformer 117 is provided in the circuit to reduce the current in the main line to a six volt, or other suitable current, for operating the photo-electric circuit 101. A lead is also taken from the main circuit to provide a power circuit to the motor 47.

In the description of the machine it has been contemplated that a series of solenoid actuated valves 44, 44A and 44B will be provided. If desired, a single valve may be provided, the spool of which may be moved by the atcion of the solenoid into various operating positions for controlling and directing the flow of hydraulic pressure fluid through the hydraulic circuit to carry out the intended operations of the machine. For the purpose of explanation, the diagrammatic showing in Fig. 10 shows the several valves 44, 44A and 44B with their movable plungers or spools in different positions for directing the flow of pressure fluid through the various lines as required to operate the machine.

From the foregoing, it will be seen that I have provided a dispensing machine which is particularly adapted to extrude, cut-off and dispense materials of a plastic nature such for example as butter or other food stuffs or dairy products, the machine being particularly characterized by:

1. Its measurement of the thickness of the extruded material at the extrusion orifice 28.

2. The provision of a refrigerated tube 28 and container 27, the body portions of which may be formed of dairy metal or similar heat conducting material and which is closed at its front by a pivotally mounted transparent panel 29 of a plastic material or glass.

3. The transparent pivotally mounted door 29 which may be fully opened to permit complete access to all parts of the refrigerated container 27 and the extrusion orifice 28 so as to permit ready servicing or cleaning of this portion of the machine. If formed of transparent plastic materials, the door will possess heat insulating properties which will permit the visual inspection of the interior of the tube during the operation of the machine without causing undesirable heat loses therethrough.

4. The operating cycle of the machine which provides instantaneous operation and cut-off of the butter chip 70 while provision is made to cut the pressures off the piston 37 to prevent any undesired or unintended extrusion of the material. This is accomplished by causing the hydraulic power fluid to be by-passed to the sump 48 during the cut-off operation, and again after the completion of the extrusion cycle. This relieves the extrusion pressure on the materials in the container 27 so that after the extruded material is cut-off and after the next chip has been extruded there is no further pressure exerted on it to effect extrusion thereof until the cut-off mechanism is re-set for the next machine operation.

I claim:

1. A dispensing machine adapted on each operation to extrude, cut-off and dispense a predetermined portion of an extrudable bulk material, said machine including an extrusion orifice, power means for extruding an extrudable material through said orifice, a control system actuated by the material as extruded through said orifice for regulating the extent of permitted extrusion of said extruded material, said control system comprising a photo-electric control circuit, a light source adapted to throw a light beam across said orifice to activate a photo-electric cell in said photo-electric control circuit until the path of said beam is cut by the material extruded from said orifice, and a power actuated cut-off mechanism adapted to cut-off a predetermined thickness of extruded material.

2. A dispensing machine adapted on each operation to cut-off, dispense and extrude a predetermined portion of an extrudable bulk material and including an extrusion orifice, power means for extruding an extrudable material through said orifice, an adjustable control member actuated by the material as extruded through said orifice for regulating the extent of permitted extrusion of said extruded material, said control member comprising a photo-electric control circuit, a light source arranged to throw a light beam across said orifice for contact with a photo-electric cell electrically connected in said photo-electric control circuit until the path of said light beam is broken by a predetermined extrusion of the material extruded from said orifice, and a power actuated cut-off mechanism adapted to cut-off a predetermined thickness of the extruded material and comprising a vertically reciprocating knife mounted adjacent said orifice and connected with a power member for driving said knife during its cut-off stroke.

3. A dispensing machine particularly adapted to cut-off, dispense and extrude a predetermined serving of a bulk food material, and having an open face storage and pressure chamber communicating with an extrusion orifice, and a transparent panel secured to said chamber and normally closing the open face thereof, said machine comprising the combination of power means for extruding the bulk food material from said chamber and through said orifice, and an adjustable control member for controlling said power means in accordance with the amount of material extruded through said orifice, said control member including a photo-electric control circuit, a light source arranged to throw a light beam across said orifice for contact with a photo-electric cell electrically connected in said photo-electric control circuit until the path of said light beam is broken at a predetermined point by the material extruded from said orifice, and a power actuated cut-off mechanism adapted to cut-off a predetermined portion of the material after completion of the extrusion thereof.

4. A dispensing machine particularly adapted to cut-off, dispense and extrude a predetermined portion of a bulk food material, and having an open face storage and pressure chamber communicating with an extrusion orifice, and a transparent panel secured to said chamber and normally closing the open face thereof, said machine comprising the combination of power means for extruding the bulk food material from said chamber and through said orifice, and an adjustable control member for controlling the operation of said power means in accordance with the amount of material extruded through said orifice, said control member comprising a photo-electric control circuit, a light source arranged to throw a light beam across said orifice to act on a photo-electric cell electrically connected in said photo-electric control circuit until the said light beam is broken by the material extruded from said orifice, and means for varying the point at which said light beam is broken by said extruded material, a power actuated cut-off mechanism adapted to cut-off a predetermined portion of the extruded material, and comprising a reciprocating knife mounted adjacent said orifice and connected with a power member for driving said knife in its cut-off stroke.

5. In a dispensing apparatus, the combination with a container having an open end and having a moveable ejector reciprocally mounted therein, of a cutting member moveable transversely of said open end, power means for moving said ejector and comprising an hydraulic power member connected with a source of hydraulic pressure fluid and a control system for controlling the operation of said power means in accordance with the amount of material ejected through the open end of said container.

6. In a dispensing apparatus the combination with a container having an open end, of a moveable ejector, a cutting member moveable transversely of the open end of said container, power means for moving said ejector and a control system for controlling the operation of said power means in accordance with the amount of material ejected through the open end of said container, said control system including a light source arranged to throw a light beam across the open end of said container, and a photo-electric control circuit electrically connected with said power means and controlled by said light beam whereby said power means is prevented from effecting material feeding movement of said ejector after the extruded material has intercepted said light beam at a predetermined point.

7. In a dispensing apparatus the combination with a container having an open end and a transparent front panel, of a moveable ejector mounted for reciprocation in said container, a cutting member moveable transversely of said open end, power means for moving said ejector in said container and comprising an hydraulic power member connected with a source of hydraulic pressure fluid, and an adjustable control system for controlling the operation of said power means in accordance with the amount of material ejected through the open end of said container.

8. In a dispensing apparatus, the combination with a dispensing container having an open end, of a moveable ejector mounted for reciprocation in said container, a cutting member moveable transversely of said open end, power means for moving said ejector and comprising an hydraulic power cylinder operatively connected with a source of hydraulic pressure fluid, a control system for controlling the operation of said power means in accordance with the amount of material ejected through the open end of said container, said control system including a light source arranged to throw a light beam across the said open end of said container, and a photo-electric control circuit electrically connected with said power means and controlled by the light beam from said light source whereby the said power means is prevented from effecting further movement of the said ejector when the extruded material cuts the said light beam at a predetermined point.

9. In a dispensing apparatus, the combination with a container having an open end and a transparent front panel, of a moveable ejector mounted for reciprocation in said container, a cutting member moveable transversely of the open end of said container, power means for moving said ejector and comprising an hydraulic power cylinder operatively connected with a source of hydraulic pressure fluid, a control system for controlling the operation of said power means in accordance with the amount of material ejected through the open end of said container, said control system comprising a light source arranged to throw a light beam across the said open end of said container to operate a photo-electric cell comprising part of a photo-electric control circuit electrically connected with said power means whereby the said power means is cut off and further movement of the said ejector is stopped when the extruded material intercepts the said light beam at a predetermined adjustable point.

10. In a dispensing apparatus, the combination with a container having an open end and a transparent front panel, of a moveable ejector mounted for reciprocation in said container, a cutting member moveable transversely of said open end, and comprising a reciprocating knife, an electromagnetic solenoid connected therewith, a control switch for selectively actuating said solenoid to operate said knife and cut-off extruded material in a plane adjacent the open end of said container, power means for moving said ejector and comprising an hydraulic power cylinder operatively connected with a source of hydraulic pressure fluid and a control system for regulating the operation of said power means in accordance with the amount of material ejected through the open end of said container.

11. In a dispensing apparatus, the combination with a container having an open end and a transparent front panel of a moveable ejector mounted for reciprocation in said container, a cutting member moveable transversely of said open end and comprising a reciprocating knife, an electromagnetic solenoid connected therewith, a control switch for selectively actuating said solenoid to operate said knife to cut-off extruded material in a plane adjacent the open end of said container, power means for moving said ejector and comprising an hydraulic power cylinder operatively connected with a source of hydraulic pressure fluid and a control system for regulating the operation of said power means in accordance with the amount of material ejected through the open end of said container and comprising a light source arranged to throw a light beam across the said open end of said container, and a photo-electric control circuit electrically connected with said power means and actuated by said light beam to permit operation of the said power means to effect movement of the said ejector until the extruded material intercepts the said light beam and cuts it off from said photo-electric circuit.

12. A dispensing machine adapted to cut off, dispense and extrude a single chip or patty of butter of a predetermined consistency, said machine including a refrigerated storage chamber communicating with an extrusion nozzle, power means associated with said chamber for extruding butter from said chamber through said nozzle, an adjustable control operatively positioned relative to said nozzle and controlled by the butter when extruded through said nozzle for controlling the extent of permitted extrusion of the butter, and a power actuated cut-off mechanism adapted to cut off the extruded butter and form a separate chip or patty, said cut-off mechanism comprising a vertically reciprocating knife mounted adjacent the discharge end of said nozzle and connected with a power member for driving said knife in its downward cut off stroke, and control means for said power means for preventing extrusion of butter during the return stroke of said reciprocating knife.

13. A dispensing machine particularly adapted to cut off, dispense and extrude a predetermined single serving of butter of a predetermined consistency, and having an open face refrigerated storage and pressure chamber communicating with an extrusion nozzle, and a transparent panel secured to said chamber and normally closing the open face thereof, said machine comprising the combination of power means associated with said chamber for extruding the butter from said chamber and through said nozzle and an adjustable control member positioned relative to said nozzle for controlling said power means in accordance with the amount of butter extruded through said nozzle, and a power actuated cut-off mechanism mounted adjacent said nozzle and adapted to cut off a single portion of butter of predetermined thickness on each operation of the machine.

14. A dispensing machine adapted to dispense on each operation a single serving of an edible fat, the consistency of which varies with the temperature to which it is subjected, said machine comprising a refrigerated bulk storage chamber and an extrusion nozzle connected therewith, a control for regulating the temperature of said chamber and nozzle to control the consistency of the extruded edible fat, power actuated means movable in said bulk storage chamber for extruding through said nozzle on each operation of the machine, the predetermined amount of edible fat which comprises a single serving, an adjustable control member positioned relative to said nozzle for controlling said power actuated means in accordance with the amount of edible material to be extruded on each operation of the machine, and a manually controlled power actuated cut-off to cut off a previously extruded serving of the edible fat.

15. A dispensing machine as claimed in claim 14 and further characterized in that the power actuated means in said bulk storage chamber is hydraulically actuated.

16. A dispensing machine as claimed in claim 14 and further characterized in that said adjustable control member comprises a light-responsive electrically actuated control circuit having a light beam and a light-responsive element positioned adjacent the discharge end of said extrusion nozzle and located to permit breaking of the light beam by the edible fat at a predetermined point after its extrusion through said nozzle.

17. A dispensing machine as claimed in claim 16 and further characterized in that the power actuated means in the said bulk storage chamber is hydraulically actuated by a hydraulic pump driven by an electric motor connected with said adjustable control member.

18. A dispensing machine as claimed in claim 17 and further characterized in that means are provided to prevent extrusion of the edible fat through said extrusion nozzle during the return stroke of said power actuated cut-off.

FREDERICK ORLO JOHNSON.

REFERENCES CITED

The following references are of record in the file of this patent:

UNITED STATES PATENTS

| Number | Name | Date |
|---|---|---|
| 1,001,230 | Sullivan | Aug. 22, 1911 |
| 1,001,231 | Sullivan | Aug. 22, 1911 |
| 1,454,769 | Schwantes | May 8, 1923 |
| 1,535,541 | Noble | Apr. 28, 1925 |
| 2,162,106 | Ness | June 13, 1939 |
| 2,256,595 | Metcalf | Sept. 23, 1941 |
| 2,381,505 | Lindholm | Aug. 7, 1945 |

FOREIGN PATENTS

| Number | Country | Date |
|---|---|---|
| 237,689 | Germany | Aug. 25, 1911 |
| 799,917 | France | Dec. 27, 1935 |